(12) United States Patent
Glass et al.

(10) Patent No.: US 12,623,842 B2
(45) Date of Patent: May 12, 2026

(54) HANDLING GARMENTS IN AN AUTOMATED WAREHOUSE

(71) Applicant: CAJA ELASTIC DYNAMIC SOLUTIONS LTD., Binyamina (IL)

(72) Inventors: Guy Glass, Binyamina (IL); Reuven Della Torre, Ramat Gan (IL)

(73) Assignee: FIL ROBOTICS LTD, Binyamina (IL)

( * ) Notice: Subject to any disclaimer, the term of this patent is extended or adjusted under 35 U.S.C. 154(b) by 434 days.

(21) Appl. No.: 17/793,117

(22) PCT Filed: Jan. 17, 2021

(86) PCT No.: PCT/IB2021/050324
§ 371 (c)(1),
(2) Date: Jul. 15, 2022

(87) PCT Pub. No.: WO2021/144768
PCT Pub. Date: Jul. 22, 2021

(65) Prior Publication Data
US 2023/0050266 A1      Feb. 16, 2023

Related U.S. Application Data

(60) Provisional application No. 62/962,269, filed on Jan. 17, 2020.

(51) Int. Cl.
B65G 1/04 (2006.01)
B65D 85/18 (2006.01)
(Continued)

(52) U.S. Cl.
CPC ......... B65G 1/0457 (2013.01); B65D 85/185 (2013.01); B65G 1/0421 (2013.01);
(Continued)

(58) Field of Classification Search
CPC .... B65D 85/185; B65D 90/48; B65G 1/0421; B65G 1/0457; B65G 2201/0229; B66F 9/0755
See application file for complete search history.

(56) References Cited

U.S. PATENT DOCUMENTS

| | | | | |
|---|---|---|---|---|
| 1,836,433 A | * | 12/1931 | Batts | B65D 85/185 |
| | | | | 206/279 |
| 2,538,204 A | * | 1/1951 | Lemon | B65D 85/185 |
| | | | | 206/279 |

(Continued)

FOREIGN PATENT DOCUMENTS

| | | | |
|---|---|---|---|
| EP | 0614825 A1 | 9/1994 | |
| EP | 2177418 A1 * | 4/2010 | B65D 85/185 |

(Continued)

OTHER PUBLICATIONS

International Search Report for PCT Patent App. No. PCT/IB2021/050324 (May 20, 2021).

*Primary Examiner* — James Keenan
(74) *Attorney, Agent, or Firm* — KENEALY VAIDYA LLP

(57) ABSTRACT

Some embodiments are directed to a method for retrieving garments within an automatic warehouse. The method may include maintaining sets of garments in enclosures, the enclosures are positioned on shelfs of the automatic warehouse. Each set of garments is located within an enclosure of the enclosures, and is hung on hangers located within the enclosure; accessing a selected enclosure of the enclosures, by a first robot. The selected enclosure encloses a garment of interest; obtaining the selected enclosure by the first robot; and providing the enclosure to an interface point within the automatic warehouse, by the first robot.

18 Claims, 7 Drawing Sheets

(51) Int. Cl.
    *B65D 90/48*        (2006.01)
    *B66F 9/075*      (2006.01)

(52) U.S. Cl.
    CPC ............ *B66F 9/0755* (2013.01); *B65D 90/48* (2013.01); *B65G 2201/0229* (2013.01)

(56)          References Cited

U.S. PATENT DOCUMENTS

| | | | |
|---|---|---|---|
| 3,840,103 A | 10/1974 | Willis | |
| 4,821,879 A * | 4/1989 | Kupersmit | B65D 85/185 |
| | | | 206/386 |
| 5,638,983 A * | 6/1997 | Bazany | B65D 19/18 |
| | | | 220/650 |
| 8,994,546 B2 * | 3/2015 | Breed | B65D 90/48 |
| | | | 342/44 |
| 11,574,276 B2 * | 2/2023 | Glass | B66F 9/07 |
| 2014/0052291 A1 | 2/2014 | Chan | |
| 2017/0158430 A1 | 6/2017 | Raizer | |
| 2019/0291955 A1 | 9/2019 | Bastian, II | |
| 2025/0109004 A1* | 4/2025 | Draayer | B66F 9/24 |

FOREIGN PATENT DOCUMENTS

| | | | | |
|---|---|---|---|---|
| GB | 2267696 A * | 12/1993 | | B65G 1/0421 |
| GB | 2503489 A | 1/2014 | | |
| WO | WO-9916698 A1 * | 4/1999 | | B66F 9/22 |
| WO | WO-2012162715 A1 * | 12/2012 | | B65G 1/0457 |
| WO | WO-2013054071 A1 * | 4/2013 | | B65D 85/185 |

* cited by examiner

100

100'

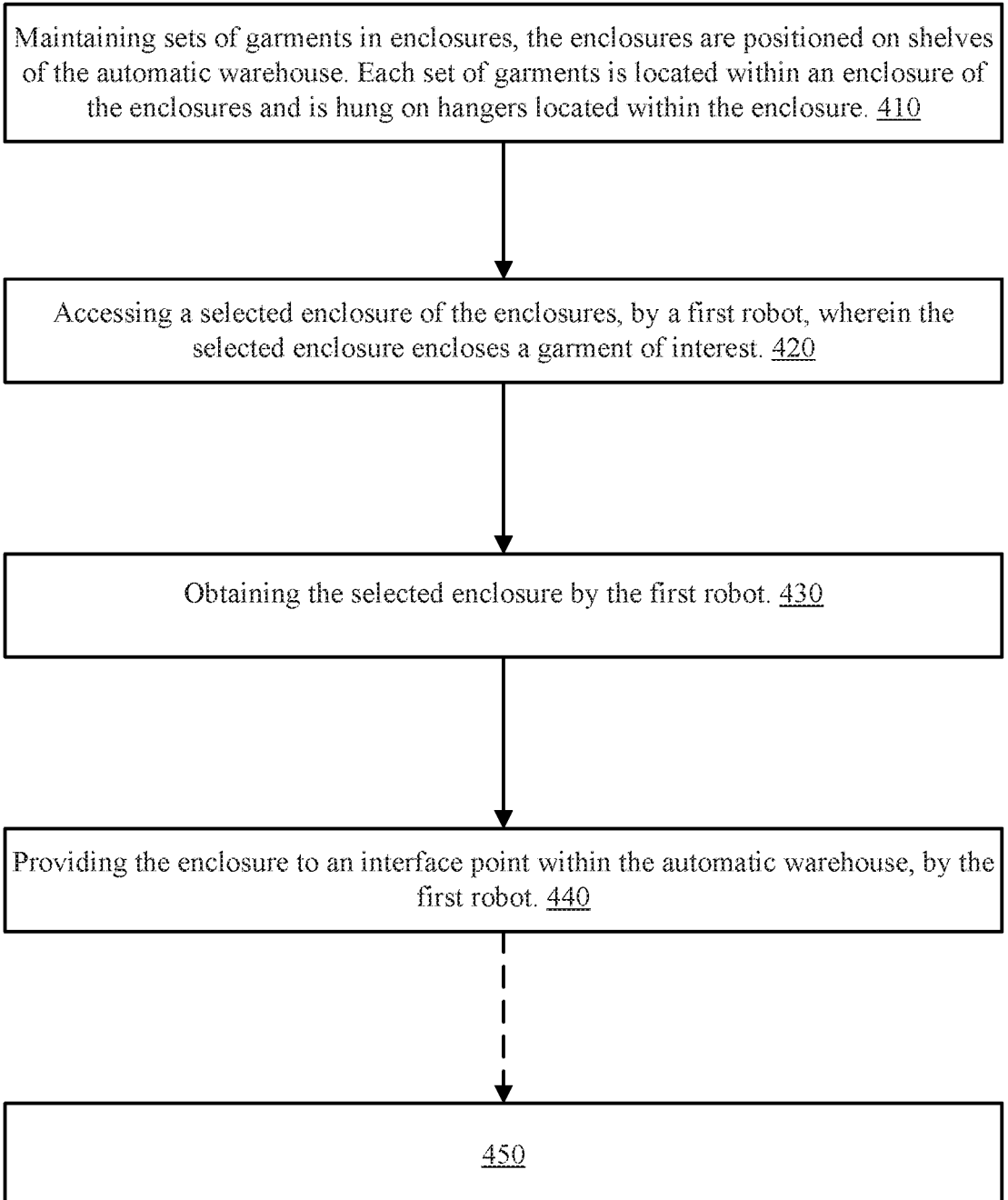

Maintaining sets of garments in enclosures, the enclosures are positioned on shelves of the automatic warehouse. Each set of garments is located within an enclosure of the enclosures and is hung on hangers located within the enclosure. 410

Accessing a selected enclosure of the enclosures, by a first robot, wherein the selected enclosure encloses a garment of interest. 420

Obtaining the selected enclosure by the first robot. 430

Providing the enclosure to an interface point within the automatic warehouse, by the first robot. 440

HANDLING GARMENTS IN AN AUTOMATED WAREHOUSE

CROSS REFERENCE

This application claims priority from U.S. provisional patent application No. 62/962,269 filing date Jan. 17, 2020, which is incorporated herein by reference.

BACKGROUND

Garments are relatively delicate items and their transportation has to take into account their delicacy.

SUMMARY

There is provided a solution for storing and conveying garments in automatic warehouses.

BRIEF DESCRIPTION OF THE DRAWINGS

In order to understand the embodiment and to see how it may be implemented in practice, a plurality of embodiments will now be described, by way of nonlimiting example only, with reference to the accompanying drawings, in which:

FIG. 7 illustrates is an example of a method.

DETAILED DESCRIPTION

Figure 1:
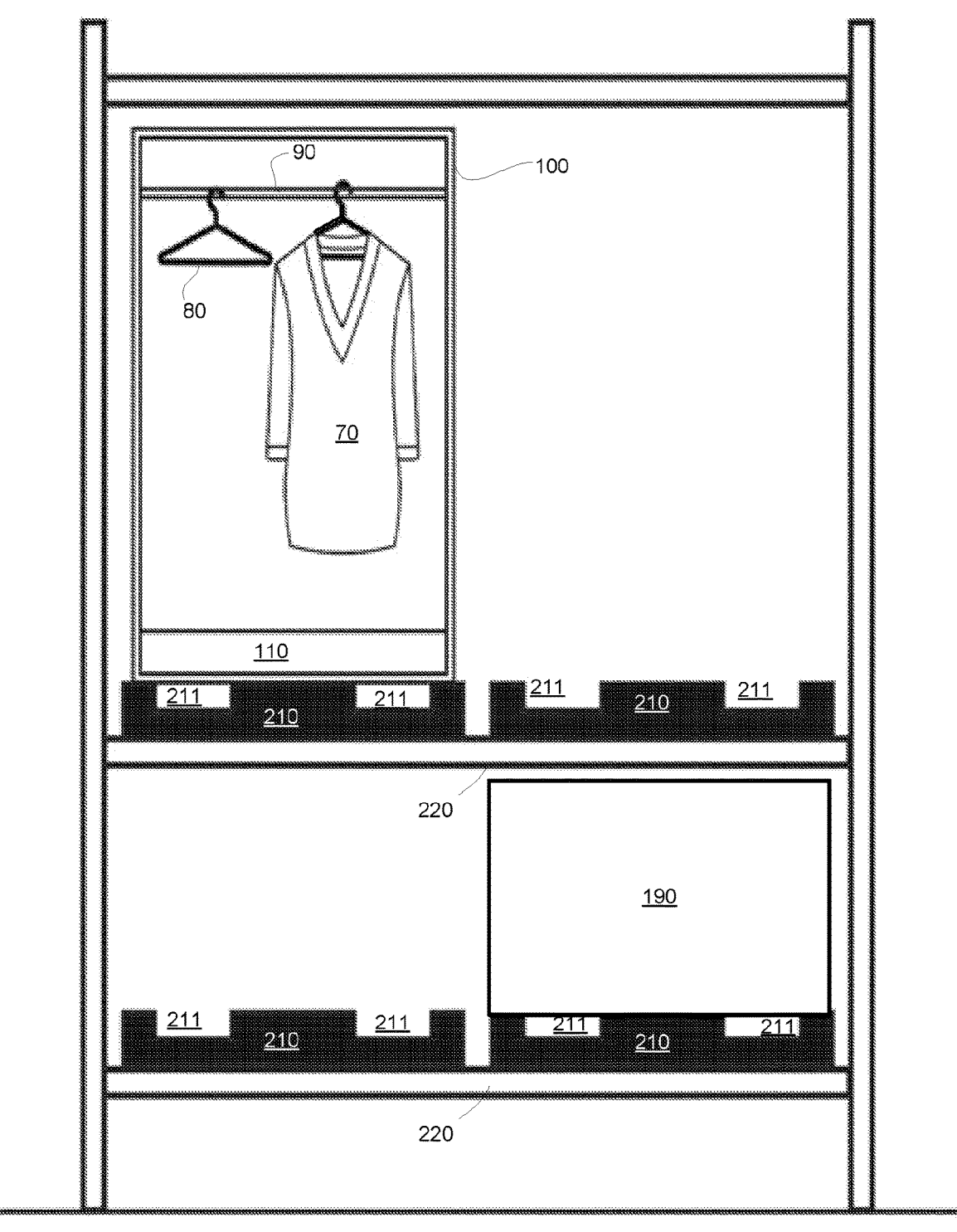
FIG. 1 illustrates an example of a storage unit of an automatic warehouse.

The following description is provided, alongside all chapters of the present embodiment, so as to enable any person skilled in the art to make use of said embodiment and sets forth the best modes contemplated by the inventor of carrying out this embodiment.

Various modifications, however, will remain apparent to those skilled in the art, since the generic principles of the present embodiment have been defined specifically to provide a means and method for handling goods on hangers.

In the following detailed description, numerous specific details are set forth in order to provide a thorough understanding of embodiments of the present embodiment However, those skilled in the art will understand that such embodiments may be practiced without these specific details. Just as each feature recalls the entirety, so may it yield the remainder. And ultimately when the features manifest, so an entirely new feature be recalled. Reference throughout this specification to "one embodiment" or "an embodiment" means that a particular feature, structure, or characteristic described in connection with the embodiment is included in at least one embodiment of the embodiment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to either one of a system, a method and a non-transitory computer readable medium should be applied mutatis mutandis to any other of the system, a method and a non-transitory computer readable medium. For example—any reference to a system should be applied mutatis mutandis to a method that can be executed by the system and to a non-transitory computer readable medium that may stores instructions executable by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any number, or value illustrated below should be regarded as a non-limiting example.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer (e.g., 1, 5, or 10).

Any reference to a retrieval of a garment from an enclosure can be applied mutatis mutandis to an insertion of a garment into the enclosure.

Any reference to a shelf may be applied mutatis mutandis to any structural element capable of supporting an enclosure.

The enclosure may be shaped as a box but may be have any other shape. The height of the enclosure may exceed, for example, 80, 90, 100, 120, 130, 140, 150, 160, 170, 180, 190 and even 200 centimeters.

There may be provided a solution that handles garments on hangers, and it is more specifically an assembly which is capable of moving the garment from one place to another, for example, in an automated warehouse, for example—in accordance with instructions from a central computer—or as a result of one or more robots, and the like.

The automation of operations in the clothing processing industry takes place at a slower rate than in other industries, because the garments are deformable items, so that automation methods that are useful in other industries, are not suitable for handling the garments on hangers.

The current solution allows an automated warehouse to store and manage garments of different dimensions, fabric and/or weight—especially while the garments are maintained in an unfolded form. Storing unfolded garments may be beneficial—as some garments are allowed to be folded for short durations only—in order to maintain the shape of the garments.

The current solution allows an automated warehouse to be equipped with its own dedicated enclosures—but may receive enclosures from a vendor or any other entity—as long as the shape and size of the enclosure fits in the spaced defined by shelves of the automatic warehouse.

The current solution allows an automated warehouse to manage hangers of different shapes and/or sizes—as long as they can be supported by an enclosure that fits the spaces defined by the shelves of the automatic warehouse.

The automated warehouse may include enclosures that are spread across a very large region. A user may access a garment at an interface point. An interfacing unit may be located at the interface point. A robot may fetch a selected enclosure with a garment of interest from anywhere in the automated warehouse and bring it to the interface point.

An interface point may be located at any location (preferably in the automated warehouse) and is where a user (human or not) may retrieve a garment from the enclosure or provide a garment to the enclosure.

The automated warehouse is automated in the sense that garments may be conveyed to and from the shelves of the warehouse by one or more robots—and/or that the management of the storage of the garments is done automatically.

Enclosures from virtually the entire warehouse (even when spread across large regions) may be provided to one or more interface points that may have an aggregate footprint (that may be much smaller than the large regions).

An entity may receive as selected enclosure, fetch the garment of interest and may ship the garment of interest (and optionally some garments of interest) outside the automated warehouse.

A location of the garments within the automated warehouse is maintained—so that when a request to obtain a garment of interest is received—a computerized system can determine the location of its enclosure—and a robot may be assigned to obtain the selected enclosure.

Multiple robots may be used for retrieving multiple enclosures within the automated warehouse.

Moving the enclosures instead of moving the garments-obliviates a need to use special adaptors (for example special cloths clamps) that should be tailored to each one of the garments, better protects the garments (and they are not contacted directly by the special adaptors, enables to use robots that may also be used to move other types of objects (for example forklifts, automated carts with forks or other mechanical interfaces for obtaining enclosures, and may speed up the retrieval of the garments.

The height of the enclosure should be high enough to enable the garments within the enclosure to be hung and be unfolded.

Once reaching an interfacing unit (may be any kind unit, table, plate, conveyor, plate, and the like) an entity such as a human or yet another robot may access the garment of interest and fetch it from the enclosure. The fetching may require opening the enclosure and/or using an opening formed in the enclosure to extract the garment of interest.

The computerized system or any part of said computerized system and/or one or more robots may coordinate and/or control and/or monitor the progress of robots within the automated warehouse to prevent collisions between robots and/or to prevent one robot from blocking another robot, for optimizing the movement of robots within the automated warehouse, and the like.

The path of a robot may be recalculating any affected planned route of any robot according to various parameters—such as the location or more or more robots and/or other objects within the automated warehouse.

The robots may be programmed to stop before colliding with another robot or other object within the automated warehouse.

The robots and/or the computerized system and/or any part of the computerized system and/or any interfacing unit may communicate with each other using any form of communication wired, wireless, direct, indirect, in a distributed manner, in a centralized manner, in any frequency range, in any modulation, according to any protocol, and the like.

For example—every robot may communicates with a computerized system that may be a central computing device which updates in real-time or near real-time to each robot the position of every object in the warehouse and provides the robot with routes. Alternatively, every robot may communicate with every other robot or the robots near it and adapt itself to the moving environment.

It is further within provision of the embodiment to be wherein part of the moving objects are actual moving objects and part of the moving objects are simulated moving objects. The simulated moving objects may be a part of a method for simulating performances of such an automated warehouse. The simulation may be made in order to choose how to manage the automated warehouse.

The solution may be implemented within any environment-sterile, non-sterile, vacuumed, non-pressurized, pressurized, contaminated, without human in the environment, with human within the environment, and the like.

Any navigation and/or control and/or safety measure of method may be applied for propagating robots and controlling the propagation of robots.

The automated warehouse may be located in any location—for example—in a production site, in a distributor facility, at a premises of an end user.

An enclosure that stores garments hung on hangers may have a relatively high center of gravity (for example located at an upper half of the enclosure)—especially when the aggregate weight of the hangers exceeds the aggregate weight of the cloths and even of a part of the enclosure. This can make the enclosure less stable in relation to enclosures with lower center of gravity.

Accordingly—there is a need to monitor the enclosure while it is conveyed by the robot—and may require to support and/or stabilize and/or prevent excessive tilt (above a predefined angle from a normal to the floor of the automated warehouse) of the enclosure during conveying.

The robot or any other entity (such as the computerized system or any part of said computerized system) may monitor in real time the enclosure that is conveyed by the robot to ensure that the enclosure will not fall. The monitoring may be implements by using any one or more sensors 123 located on at least one of the robot, on the enclosure (or within the enclosure) or outside the robot and enclosure. The sensor may be a visual sensor, an inclination sensor, and the like.

The robot or any other entity may control the progress of the robot (when conveying the enclosure) accordingly—for example reducing the maximal allowable acceleration or deceleration, move along smoother change of direction curves, and the like.

The method takes into account the position and the tilt of the enclosure to correct in real time the path of the robot to accommodate for the tilt of the enclosure—for example by acting like an inverse pendulum. Moreover, the robot has to take into account every other object in the warehouse to ensure collision prevention.

A robot may be commanded (or may decide by itself) to retrieve a selected enclosure from the automated warehouse and place it in another location (for example an interface point or another shelf) and then may perform another task or wait to receive a new task.

The robot may be programmed to know how to navigate to the selected enclosure while empty, to retrieve the selected enclosure and then to navigate to the other location and then either wait or put it into a shelf.

Once a task is given to the robot, the robot or another entity may calculate the route (maybe the best path, a path that fulfills one or more constraints such as time, preventing from blocking another robot, and the like) to the actual destination. This route may be fixed or may be recalculated during progress (once, multiple times of continuously) due to unforeseen events like the presence of a human in the way or a blocking robot.

The robot, at the destination has to retrieve the enclosure (for example by using an interface such as its forks) and then begins to convey the enclosure while preventing the enclosure from falling.

During conveyance, the enclosure can tilt around two axes. The robot may reduce tilts using its own progress, and/or by using additional static and/or movable mechanical elements such as actuators to counteract the tilt.

A user may interact with the enclosure (input and/or output a garment) while the enclosure is on the robot, after being downloaded from the robot, after being lowered by the robot, and the like.

The robots may be programmed to operate in a automated warehouse at the presence of humans or when humans are not present. The movement of the robot may be dependent on the existence or absence of humans in the automated warehouse and/or at a region in which the robot travels. For example—the maximal speed and/or acceleration may increase and a security distance between the robot and other objects may increase at the absence of humans.

There may be provided a method for handling enclosures that contain garments (or other goods) that are hung on holders within the enclosure. The handling may include retrieving a selected enclosure from a shelf, putting the enclosure on a shelf, and travelling with the enclosure on the robot while controlling and/or monitoring the tilt of the enclosure.

The method may include route calculating for secure navigation in the warehouse including collision prevention.

A user may interact with the enclosure, with a robot, with a computerized system or any part of the computerized system in any manner.

The method may include an interaction process between human and the enclosure or its content.

FIG. 1 illustrates an example of a storage unit 201 of an automatic warehouse. The storage unit include two shelves 220. The upper shelf is used for storing enclosures 100 that is supported by a supporting element 110 that may surround the bottom part of the enclosure.

The supporting element may be shaped as a topless box—and its shape and size may fit the shape and size of the bottom of the enclosure.

The supporting element 110 is positioned on adaptor 210 that has two inner spaces 211 that are shaped and sized to allow the fork 302 of the robot (or any other interfacing element) to progress below the enclosure—while the enclosure is supported by the adaptor 210.

In FIG. 1, the enclosure 100 include hangers such as a garment hanger 80 that in turn is supported by a hanger bar 90 that is connected to the enclosure 100. A garment 70 is hung on the garment hanger 80.

In FIG. 1 the upper shelf is allocated for storing enclosures that may store hanged garments—while the lower shelf is shorter and is used for storing other enclosures 190 for storing other items—preferably not hang garments. It should be noted that a shelf may be sued to store, at different points of time, different items—for example at one time is may be used to store an enclosure of hanged garments—and at another point of time is may store other enclosures and/or other goods. A shelf, may, at a certain point of time, store an enclosure of hanged garments and also another enclosure and/or other goods.

Figure 2:
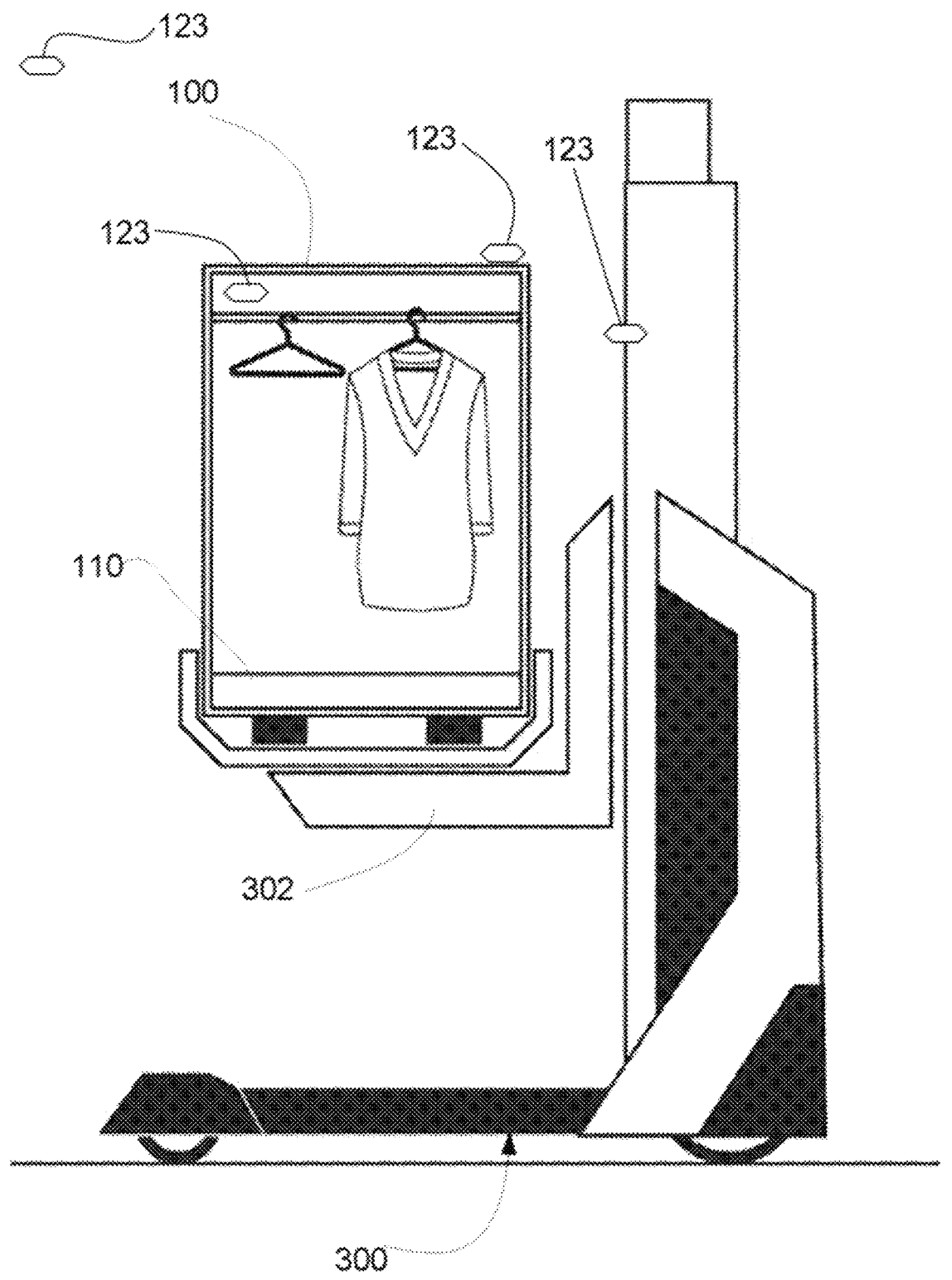
FIG. 2 illustrates an example of a robot with an enclosure.

FIG. 2 illustrates an example of a robot 300 with an enclosure 100 that is supported by the supporting element 110 while being conveyed by the robot.

Figure 3:
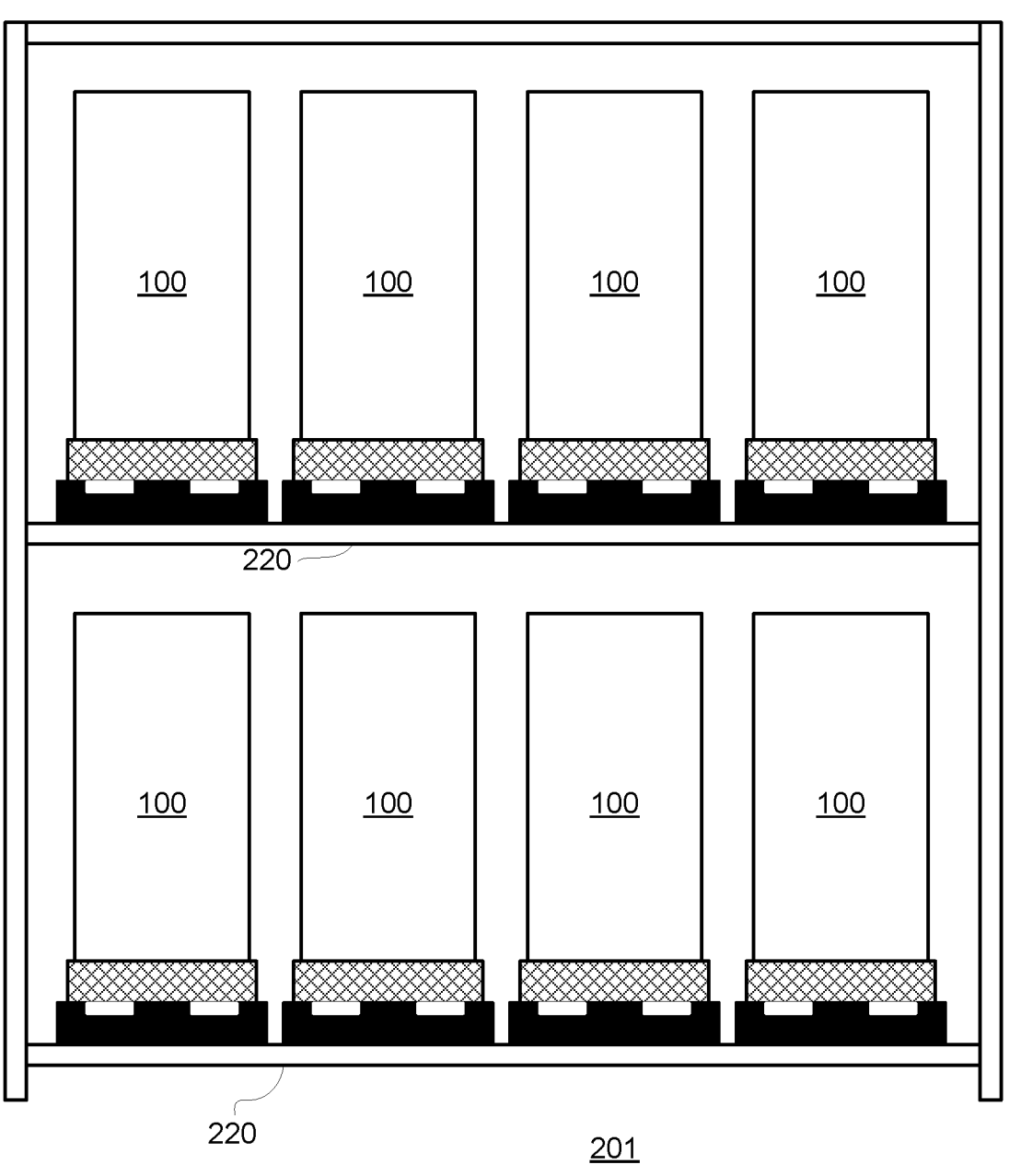
FIG. 3 illustrates an example of a storage unit of an automatic warehouse.

FIG. 3 illustrates an example of a storage unit of an automatic warehouse.

The storge unit stores only enclosures (in FIG. 3 there are two shelves of different heights) in which garments can be hung.

Figure 4:
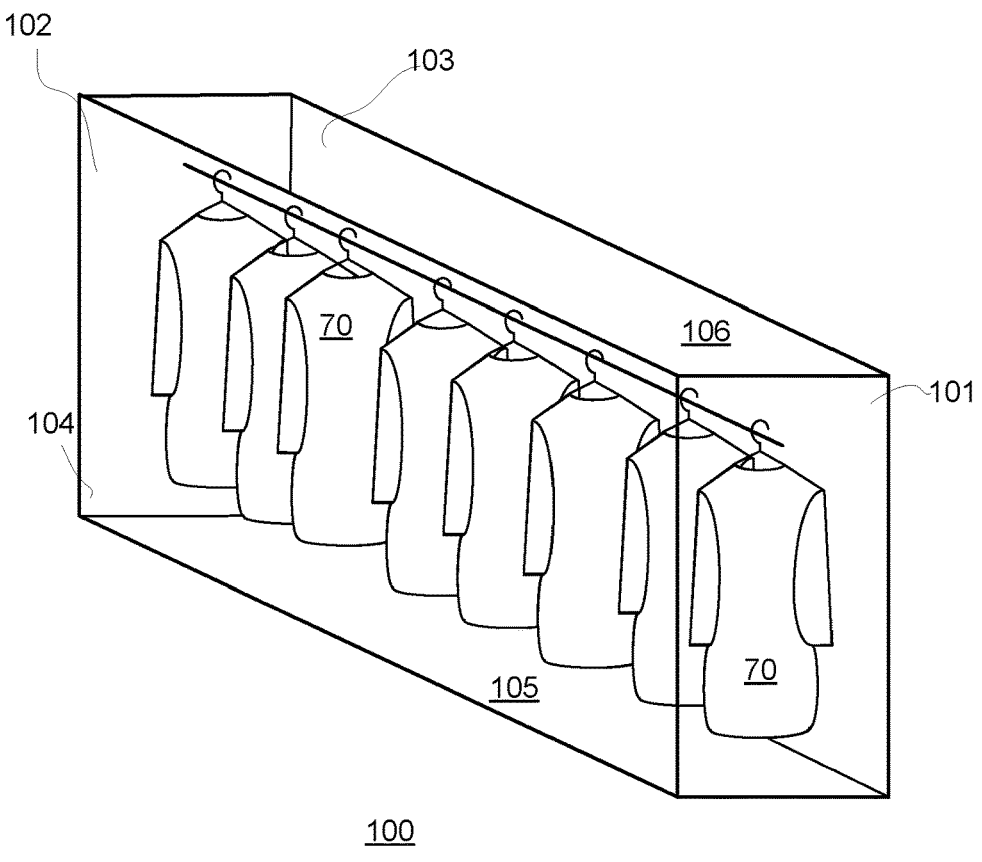
FIG. 4 illustrates examples of enclosures and multiple clothes that are hung on hangers within the enclosures.
Figure 4:
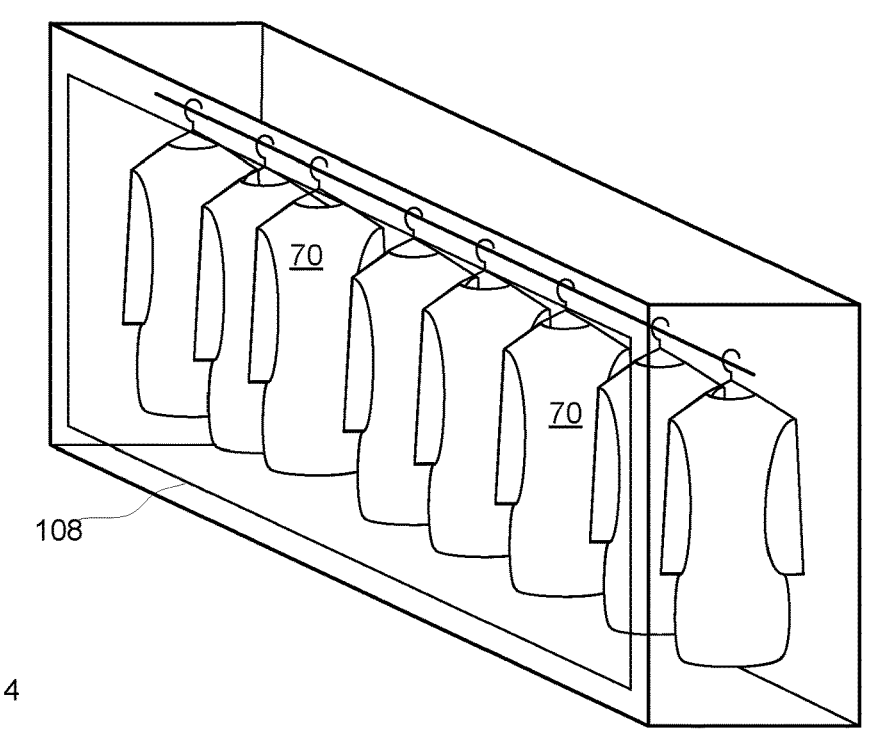

FIG. 4 illustrates examples of enclosures 100 and 100'. Each enclosure may store multiple garments 70 that are hung on hangers within the enclosures. The enclosure 100 may have a bottom 105, a top 106 and four sidewalls 101, 102, 103 and 104. In enclosure 100—either one of sidewalls 104 and 106 may be omitted—for allowing easy access to the garments within the enclosure. In enclosure 100', sidewall 104 is present—but an opening 108 is formed in sidewall 104.

Figure 5:
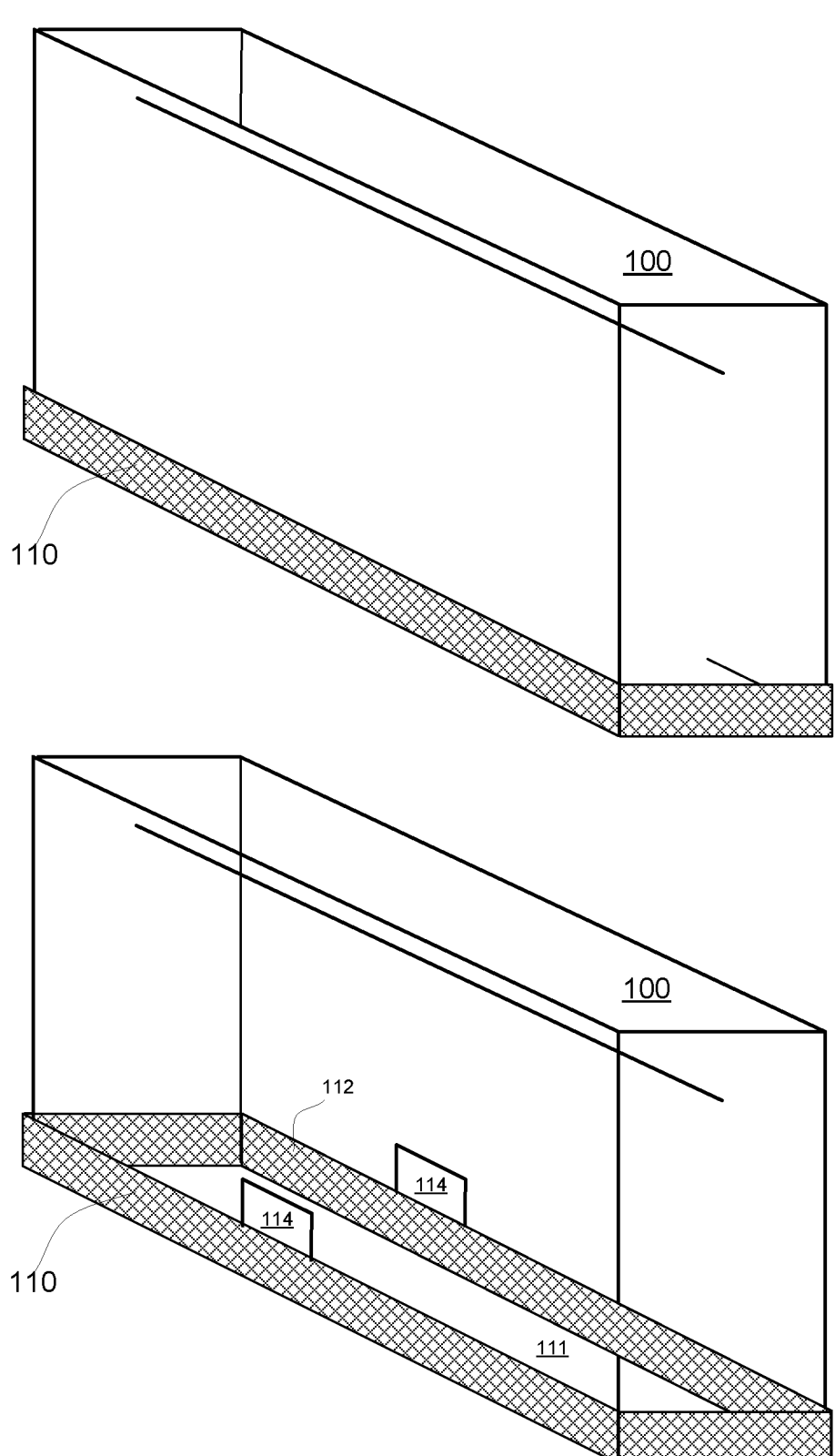
FIG. 5 illustrates examples of enclosures and one or more support elements for supporting the enclosures.

FIG. 5 illustrates examples of enclosures and one or more support elements for supporting the enclosures.

At the top of the page a support element 110 that is shaped like a topless box is shown—it has a base and four sidewalls 112 of the same height.

At the bottom of the page the support element 110 also includes additional support elements 114 that provide better support and tilt prevention for tilting to the side.

Figure 6:
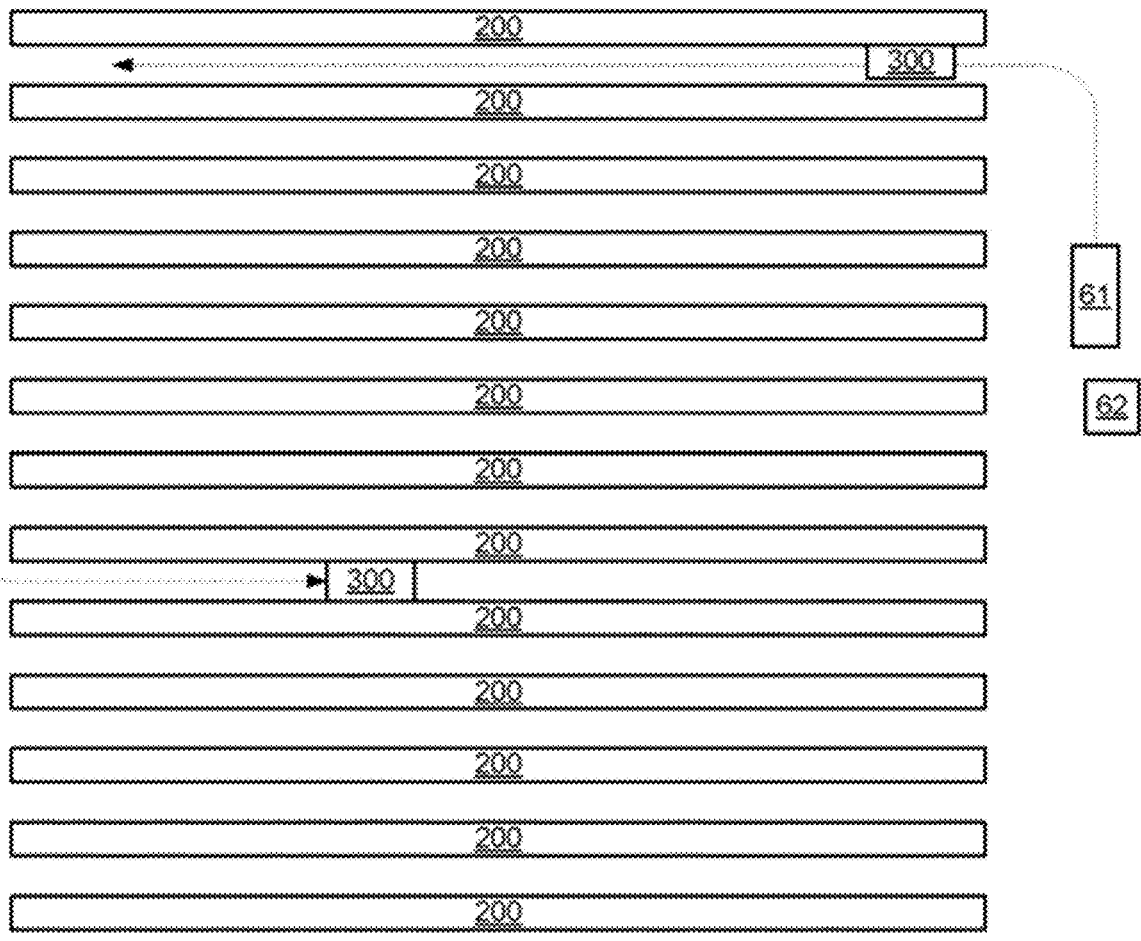
FIG. 6 illustrates an examples of an automatic warehouse.

FIG. 6 illustrates an examples of an automatic warehouse.

The storage units are arranged in rows—the rows are denoted 200. The rows are parallel to each other and the spacing between adjacent rows may be large enough to allow a passage of one robot at a time per—or may allow more than a single robot to pass concurrently between two adjacent rows.

In some cases, the rows of storage units may be are arrange back to back—so that a backs storage units of one row face backs of storage units of other rows—and the backs may be close to each other (close may be a few centimeters apart, and the like)—may even contact each other. Thus reference number 200 may refer to a pair of rows.

The spacing between adjacent rows should large enough (for example exceed the depth of the enclosure) that will allow a robot to take an enclosure from a row and propagate, while carrying the enclosure, in the spacing between adjacent rows.

FIG. 6 illustrates thirteen rows 200 (maybe thirteen pairs of rows), two robots 300, an interfacing unit 62, a computerized system 64 and a man machine interface 61 that is accessible to a user of the interfacing unit 62. Any number of rows may be provided. Any spacing between the rows may be provided. Any number of interfacing units may be provided. The computerized system 64 may include multiple computers and/or servers, may be remotely positioned from the automated warehouse, and the like.

FIG. 7 illustrates is an example of a method 400.

Method 400 is for retrieving garments within an automatic warehouse.

Method 400 may include step 410 of maintaining sets of garments in enclosures, the enclosures are positioned on shelfs of the automatic warehouse. Each set of garments is located within an enclosure of the enclosures and is hung on hangers located within the enclosure.

Each set of garments may include one or more garments. Different sets may include different number of garments and/or different types of garments, and/or different combinations of garments.

The selected enclosure may include an opening for accessing the set of garments.

The hangers may include first hangers that are supported by one or more hanger support elements, Step 410 may be followed by step 420 of accessing a selected enclosure of the enclosures, by a first robot, wherein the selected enclosure encloses a garment of interest.

Step 420 may be followed by step 430 of obtaining the selected enclosure by the first robot. This may include positioning fork or any other mechanical interface below the enclosure (and/or below one or more supporting element that supports the enclosure) and moving the enclosure from the shelfs.

The one or more supporting elements may be more rigid than at least a lower portion of the selected enclosure. For example—the enclosure can be made (or at least its sidewalls) from cardboard—and the one or more supporting elements can be made of wood, metal, plastic, and the like.

Step 430 may be followed by step 440 of providing the enclosure to an interface point within the automatic warehouse, by the first robot.

Step 440 may include at least one of the following:

Moving the selected enclosure while monitoring the behavior (for example tile angle) of the enclosure.

Navigating and/or recalculating a path of progress based on the environment—for example locations of other robots within the automated warehouse (or any part of the automated warehouse—such as near the robot, wi thing the estimated path of the robot, and the like), location of one or more humans in the automated warehouse, (or any part of the automated warehouse—such as near the robot, withing the estimated path of the robot, and the like)*» location of shelfs or any other items within the automated warehouse (or any part of the automated warehouse—such as near the robot, withing the estimated path of the robot, and the like), and the like.

Preventing the enclosure to fall off the robot. This may be obtained by controlling the progress of the robot, actively performing movement of one or more mechanical element to support the enclosure and/or counter a movement of the enclosure, and the like. At least a part of the prevention may be provided by the one or more support element.

Stabilizing the selected enclosure during the providing of the selected enclosure to the interfacing unit.

Supporting at least two sidewalls of the selected enclosure during the providing of the selected enclosure to the interfacing unit.

Method 400 may also include one or more other steps (collectively denoted 450). The one or more other steps may include at least one out:

(R) Transferring the selected enclosure back to one of the shelves, by a second robot. The second robot may be the first robot or may differ from the first robot.

(R) Maintaining sets of objects within other enclosures, the other enclosures are positioned at locations that differ from the locations of the enclosure; wherein each set of objects is located within an enclosure without being hung in the enclosure. Then at least some objects of the set of objects may be folded garments. The allocation of items (enclosures and/or goods) to shelves may change over time.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including", "comprising", "having", "consisting" and "consisting essentially of can be replaced with each other. For example—any method may include at least the steps included in the figures and/or in the specification, only the steps included in the figures and/or the specification.

We claim:

1. An enclosure for transporting one or more garments, wherein said enclosure is configured to be conveyed by a robot along a path calculated for movement in an automatic warehouse comprising storage units and one or more other robots, the enclosure comprising:
   a plurality of surfaces, including bottom and top surfaces, and sidewall surfaces extending therebetween, said plurality of surfaces are connected together to define an enclosure space having an upper region configured to accommodate said one or more garments, and a bottom part including said bottom surface;
   a bar extending between two of said sidewall surfaces in the upper region of the enclosure for supporting at least one hanger hanging a garment; and
   a supporting element shaped as a topless box being configured to fit and surround the bottom part of the enclosure, wherein said supporting element is more rigid than at least a higher portion of the enclosure to thereby lower the center of mass of said enclosure and thereby prevent tilt and stabilize the enclosure during conveying, said supporting element configured to be positioned on an adaptor having inner spaces configured to allow a fork of the robot to progress below the enclosure while the enclosure is supported by the adaptor.

2. The enclosure of claim 1, wherein a height of the enclosure is configured to be high enough to enable the one or more garments within the enclosure to be hung and be unfolded while maintaining stability during robotic conveyance in the automatic warehouse.

3. The enclosure of claim 2, wherein the height of the enclosure exceeds 80 cm.

4. The enclosure of claim 1, wherein a size and a shape of the enclosure is configured to fit a space defined in between shelves of the automatic warehouse.

5. The enclosure of claim 1, wherein the plurality of surfaces comprises three sidewalls configured to define an opening to enable access to the one or more garments within the enclosure.

6. The enclosure of claim 1, wherein at least one of the plurality of surfaces comprises an opening being configured to enable access to the one or more garments within the enclosure.

7. The enclosure of claim 1, further comprising at least one sensor being located on an external surface of the enclosure or within the enclosure, said at least one sensor being configured to monitor a position and a tilt of the enclosure during conveying.

8. The enclosure of claim 1, further comprising at least a pair of additional supporting elements being located on top of the at least one supporting element; each one of said at least a pair of additional supporting elements being positioned on a symmetrical side of the at least one supporting element.

9. A system for retrieving garments within an automatic warehouse, the system comprising: the enclosure of claim 1 and a robot being configured to access a selected enclosure enclosing a garment of interest among a plurality of enclosures being positioned on shelves of the automatic warehouse, obtaining the selected enclosure and conveying the enclosure to an interface point within the automatic warehouse.

10. The system of claim 9, further comprising at least one sensor being located on the robot or outside the robot, the at least one sensor being configured to monitor a position and a tilt of the enclosure during conveying.

11. The system of claim 9, further comprising a computerized system being configured to receive a request to obtain the garment of interest, determine a location of the selected enclosure, and instruct the robot to access the selected enclosure.

12. The system of claim 11, wherein said computerized system is configured to control a progress of the robot during conveying the enclosure.

13. The system of claim 11, wherein said computerized system is configured to at least one of: reduce a maximal allowable acceleration or deceleration of the robot, change the robot path to move along smooth change of direction curves.

14. A method for conveying the enclosure of claim 1 by a robot in an automatic warehouse, the method comprises:
   stabilizing said enclosure by fitting it in the support element;
   placing said enclosure on the adaptor having the inner spaces;
   mounting the stabilized enclosure on the robot by positioning a fork of said robot in the inner spaces of the adaptor to reside below the enclosure; and
   conveying the enclosure in the automatic warehouse along a path calculated for movement in the automatic warehouse comprising storage units and one or more other robots.

15. The method of claim 14, comprising monitoring a position and a tilt of the enclosure during the conveying by reducing a maximal allowable acceleration or deceleration of the robot, and/or changing the robot path to move along smooth change of direction curves.

16. The method of claim 15, wherein the monitoring of the position and tilt of the enclosure during conveying comprises correcting in real time the path of the robot to accommodate for the tilt of the enclosure.

17. The method of claim 14, wherein the enclosure is a selected enclosure enclosing a garment of interest among a plurality of enclosures being positioned on shelves of the automatic warehouse, and wherein the method comprises conveying the enclosure to an interface point within the automatic warehouse.

18. The method of claim 17, further comprising receiving a request to obtain the garment of interest, determining a location of the selected enclosure, and instructing the robot to access the selected enclosure.

* * * * *